UNITED STATES PATENT OFFICE.

HANS JAEGER, OF WOODSIDE, AND WALTER KUENZLER, OF NEW YORK, N. Y.

SALAD-DRESSING.

1,354,563.  Specification of Letters Patent.  Patented Oct. 5, 1920.

No Drawing.  Application filed April 14, 1920. Serial No. 373,781.

*To all whom it may concern:*

Be it known that we, HANS JAEGER, a citizen of the United States, residing at Woodside, L. I., county of Queens, and State of New York, and WALTER KUENZLER, a citizen of the United States, residing at New York city, borough of Manhattan, county and State of New York, have invented a certain new and useful Salad-Dressing, of which the following is a specification.

This invention is a food compound, and, more particularly, a dressing of the French style, the object of the invention being to provide a smooth dressing of a pleasant, palatable taste.

In the preferred manner of concocting the dressing of this invention, the following constituents are first mixed together in substantially the following proportions, by weight, and cooked:

| | |
|---|---|
| Corn starch | Approximately one part |
| Wheat powder | Approximately one part |
| Mustard (powder form) | Less than one part |
| White pepper | Less than one part |
| Paprika | Less than one part |
| Tomato purée | 10 to 15 parts |
| Water | 20 to 30 parts |
| Sugar | Approximately one part. |

These constituents are mixed together and cooked, whereupon there is added thereto the following mixture of uncooked constituents, viz:

| | |
|---|---|
| Vinegar | 10 to 20 parts |
| Olive oil | 20 to 30 parts |
| Worcestershire sauce | Approximately one part. |

At the same time there is added thereto approximately one part of onion juice, which has been cooked separately, and the dressing is seasoned by approximately one part of salt, a portion of which is added during the cooking and the remainder of which is added to the complete mass.

The corn starch and wheat powder, which, when combined, preferably constitute about two per cent. of the mass, and form a thickening substance, which lends to the mass the desired consistency and while the corn starch and wheat constituents are preferred for this purpose, other thickening agents may be employed in lieu thereof.

The proportions as set forth are those which we preferably employ, yet the present invention is not to be understood as limited to these proportions, but is to be construed as as broadly novel as is commensurate with the appended claims.

Having thus fully described the invention what we claim as new and desire to secure by Letters Patent is:

1. A salad dressing embodying a cooked composition comprising not substantially less than ten parts tomato purée, twenty parts water, and containing also mustard, paprika, and sufficient thickening material to impart the desired consistency to the mass, and to which cooked composition is added an uncooked composition of vinegar, edible oil and Worcestershire sauce, and separately cooked onion juice, the whole being mixed to a substantially staple liquid emulsion.

2. A salad dressing embodying a cooked composition comprising not substantially less than ten parts tomato purée, twenty parts water, and also containing mustard and sufficient thickening material to impart the desired consistency to the mass, and to which cooked composition is added an uncooked composition of edible oil and vinegar, the whole being mixed to a substantially staple liquid emulsion.

3. A salad dressing embodying a cooked composition comprising substantially one part corn starch, substantially one part wheat powder, less than one part mustard, less than one part white pepper, less than one part paprika, substantially one part sugar, ten to fifteen parts tomato purée, and twenty to thirty parts water, to which cooked composition has been added an uncooked mass embodying ten to twenty parts vinegar, twenty to thirty parts olive oil, approximately one part Worcestershire sauce, and to which has been further added approximately one part of separately cooked onion juice, the whole being mixed to a substantially staple liquid emulsion.

In testimony whereof we have signed our names to this specification.

HANS JAEGER.
WALTER KUENZLER.